Feb. 19, 1963   F. ZANDMAN   3,077,813
STRESS-GAUGING DEVICES
Filed Oct. 20, 1959
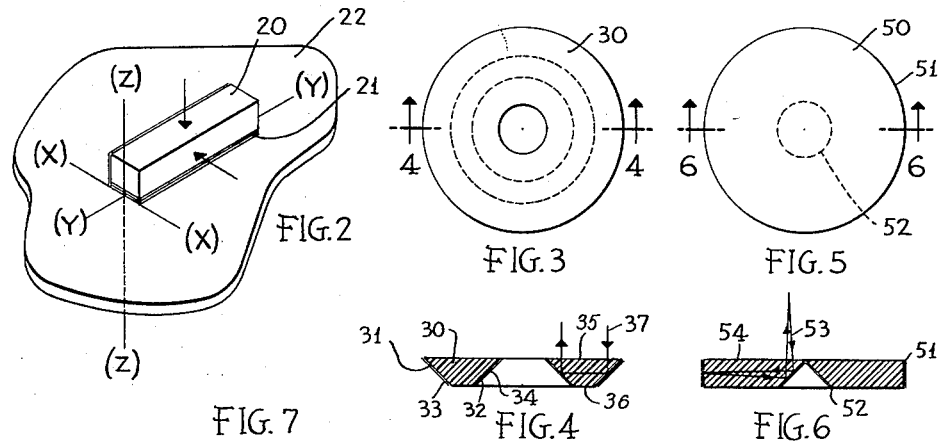
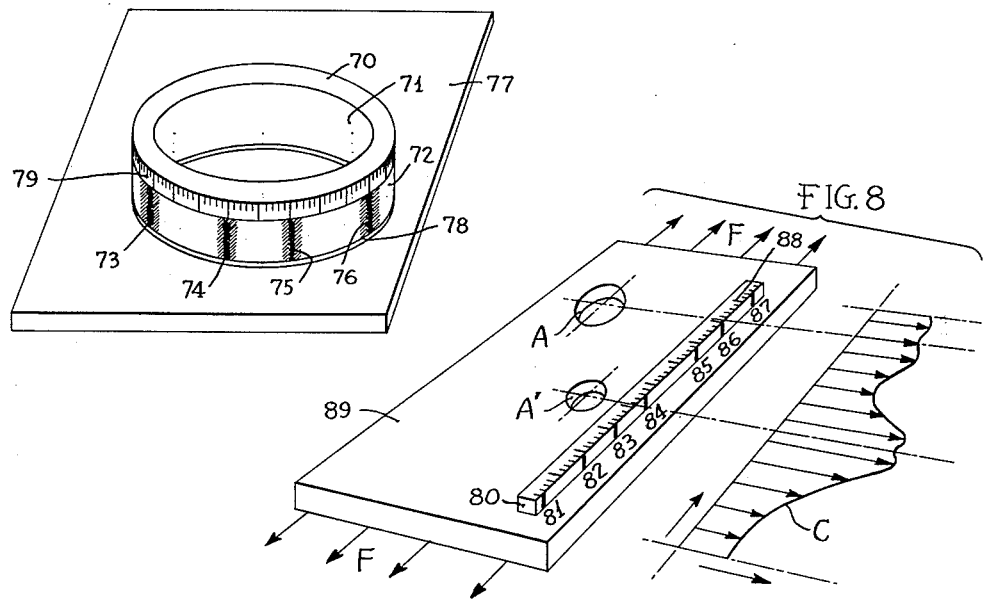
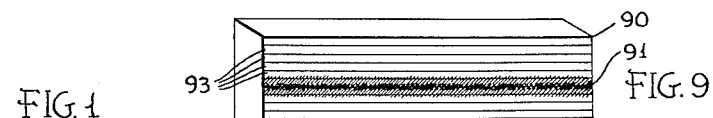
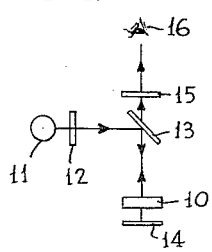
INVENTOR.
Felix Zandman
BY
ATTORNEY United States Patent Office 3,077,813
Patented Feb. 19, 1963

3,077,813
STRESS-GAUGING DEVICES
Felix Zandman, Rosemont, Pa., assignor, by mesne assignments, to The Budd Company, Philadelphia, Pa., a corporation of Pennsylvania
Filed Oct. 20, 1959, Ser. No. 847,529
2 Claims. (Cl. 88—14)

This invention pertains to strain indicators and to methods for the visual presentation of workpiece stress information, and, more particularly, to the exhibition of patterns of birefringence related to a single uniaxial stress component independently of other stress components present in the workpiece.

Conventionally, workpiece stresses are indirectly determined from measurement and analysis of workpiece strain. The well-known resistance strain gauges give requisite strain information in the form of electrical signals. The more recent photoelastic strain gauges, disclosed in the copending application of F. Zandman and S. Redner, S.N. 799,798, filed March 16, 1959, give strain information directly in the form of visible interference fringe patterns. In the special case of a uniaxial stress field or where complex strain gauge configurations are employed, stress parameters are determinable without extensive interpretation of the strain gauge information. However, there have been no simple efficient and precise direct-reading gauges for the measurement of generally directed workpiece stresses and no convenient methods for the direct determination of general stress parameter information.

It is therefore an object of this invention to provide stress gauging device whereby the magnitude of stress along any direction within a biaxial stress-strain field at the surface of a workpiece may be determined directly upon but a single observation of birefringence.

It is a further general object of this invention to provide an improved photoelastic stress gauge yielding patterns of birefringence which correspond to generally directed uniaxial workpiece stress components.

A more specific object of this invention is to provide a photoelastic stress gauge yielding uniaxial workpiece stress parameter information directly as a relative translation of the boundary fringes of a photoelastic fringe pattern.

A general discussion of photoelastic phenomena is readily available from such text book sources as "Photoelasticity" by M. N. Frocht; John Wiley and Sons, Inc., New York City, 1941, and particular details are set forth in the above-mentioned copending application. It should be sufficient here to point out that fringe patterns seen upon analysis of incident polarized light transmitted through stressed birefringent-material testpieces are related to the magnitude of the difference between maximum and minimum normal stresses in the material and to the thickness of that material traversed by the polarized light.

While the invention is particularly pointed out in the appended claims, a better understanding may be had upon consideration of the following specification in conjunction with the accompanying drawing where:

FIG. 1 illustrates a simplified system for photoelastic studies;
FIG. 2 is a schematic illustration of a stress gauge and its application according to this invention;
FIG. 3 illustrates a washer-like stress gauge embodiment in elevation;
FIG. 4 is a cross section view of the FIG. 3 device;
FIG. 5 illustrates a higher sensitivity alternative configuration for the device of FIG. 4;
FIG. 6 is a cross section view of the FIG. 5 device;
FIG. 7 illustrates a cylindrical embodiment of the stress gauge including a biasing pattern of birefringence;
FIG. 8 depicts a parallelepiped stress gauge exhibiting displacement of a lateral pattern of biasing birefringence;
FIG. 9 illustrates modification of the FIG. 7 embodiment to provide a longitudinal bias pattern; and
FIG. 10 shows displacement of the FIG. 9 pattern in response to the workpiece stress condition of FIG. 8.

FIGURE 1 illustrates a simplified system for photoelastic studies in conjunction with a generalized photoelastic testpiece 10. Ordinary light from a source 11 may be directed through a polarizer 12 and, by means of a half-silvered mirror 13, normally through testpiece strata 10. The polarized light transmitted through the testpiece may be reflected by a mirror surface 14 and retransmitted through the testpiece 10 to pass through half-silvered mirror 13 and a second plane polarizer, analyzer, 15 for viewing at a position indicated at 16. Various other auxiliary devices may be employed optionally and could include a compensator, a quarter-wave plate for circularly polarized light, and various light directing devices.

With particular reference to FIG. 2, a photoelastic testpiece 20 of a birefringent material such as a clear glycerin phthallic anhydride sold under the trademark Bakelite, a solid collodial mixture of nitrocellulose in camphor sold under the trademark Celluloid, or a similar plastic is bonded by means of a layer of adhesive material 21 to a generalized workpiece 22. Directions XX, YY are parallel with principal stresses $p$, $q$ and with principal strains $e_p$, $e_q$ induced in the workpiece 22 by external loads. During loading principal stresses $p'$, $q'$ are induced in the testpiece due to the bonding and are parallel with the workpiece principal stresses. Principal strains in the testpiece $e'_p$, $e'_q$ are respectively parallel with and equal to $e_p$, $e_q$. The principal stress in the testpiece in the direction ZZ is $r'=0$. Poisson's ratios and the elastic moduli are taken as E, E' and $m$, $m'$ for the workpiece and testpiece materials, respectively.

Observations of birefringence by means of polarized light directed through the testpiece 20 parallel with direction XX yield interference fringe information proportional to the relative retardation $d$ between the extraordinary and ordinary light rays according to the stress optical relationship:

$$dk=(p'-r')=p'$$

where $k$ is a determinable parameter.

The relationship between the maximum principal stress $p$ and the principal workpiece strains is given by:

$$p=(e_p+me_q)E/1-m^2$$

and for the principal strain $p'$ in the testpiece the relationship may be written as:

$$p'=(e_p+m'e_q)E'/1-(m')^2$$

since the testpiece and workpiece strains are substantially equal.

When the material of the testpiece is chosen to have $m'=m$, it follows that:

$$p=p'E/E'=dk'$$

where $k'$ is a predeterminable constant factor.

It is not necessary that Poisson's ratios for the testpiece and workpiece be exactly equal and they may differ considerably if $k'$ also includes a factor, $1-(m')^2/1-m^2$ so long as the factor $(m'-m)e$ may be neglected in the simultaneous solution of the above relationships for $p$ and $p'$.

Since the testpiece stress $s'_\theta$ in an arbitrary direction $\theta$ is a function of $p'$, $q'$ and $\theta$ and since the parallel workpiece stress $s_\theta$ is a similar function of $p$, $q$ and $\theta$, it follows that:

$$s_\theta = k'd_{(\theta+90°)}$$

In this development, the workpiece surface is tacitly assumed to be a plane surface. The analysis is not altered, however, in the case of a curved workpiece surface since in that case the incremental area 22 may be considered sufficiently small so as to be the equivalent of a plane surface within any finite limits.

It will be apparent that this unique method of photoelastic observation resides in transmission of light through a test piece in a direction parallel with the workpiece surface to which the testpiece is attached. In the past observations have been made in a direction normal to the testpiece surface and the observed patterns of birefringence have been due to the difference between two principal stresses, each of unknown magnitude. Each such conventional observation yields one relationship having two unknowns and necessarily must be repeated in a non-redundant manner to provide sufficient information for simultaneous solution for the two unknowns. By the method of this invention, however, one of the pertinent normal stresses, $r'$ along ZZ is known, i.e. $r'=0$.

As pointed out above, birefringence in a path direction parallel with the workpiece surface is related directly to the workpiece stress normal to that direction, generally and without regard to the directions of the principal stresses. Therefore, it is possible, according to this invention, to construct a stress gauge which yields not only information as to the magnitude of workpiece stresses but also as to the directions of the principal stresses in an unknown stress field. Observations along different directions may be compared to find the maximum stress direction or the minimum stress direction.

Therefore, according to this invention, a stress gauge of the form shown in FIGURES 3 and 4 yields both the directions and the magnitudes of principal stresses along with the magnitude of stresses along any other given direction. Such an embodiment in the plan view of FIG. 3 and the cross-section view of FIG. 4, is seen to comprise a circular washer 30 with conical edges 31 and 32. Reflecting coatings 33 and 34 may be provided contiguous with surfaces 31 and 32 at an angle 45° with lateral gauge surfaces 35 and 36.

A light ray 37 incident normally of lateral surface 35 will travel through the birefringent material of the gauge 30 parallel with the lateral surface 36 upon reflection at interfaces 31—33 and 32—34.

While the thickness of the material 30 is exaggerated in FIGURE 4, it should be relatively thin, since a small error is introduced in the observed birefringence due to the light path portions normal to the workpiece surface. This normal path component may be made as small as desired relative to the lateral path portion. Therefore, when a beam of light is directed in normal incidence upon the strata 30 over the whole of the region subtended by reflector 33, and the field of observation is of the whole of the area subtended by reflector 34, birefringence pattern portions will vary with respect to their angular orientations. The maximum observed birefringence will be related to the direction of the maximum principal stress in the workpiece and the minimum observed birefringence, observed at the angular position 90° from the direction of the maximum principal stress, will be related to the magnitude of the minimum principal stress. Obviously, observations can be taken at intermediate angular positions between the directions of the maximum and minimum principal stresses to determine the magnitude of stresses in any direction. It should be noted that this easily manufactured and easily applied and interpreted device yields, uniquely, in one field of view all of the information needed to describe the stress field at the workpiece surface.

In FIGURES 5 and 6 is shown a variation of the stress gauge of FIGURES 3 and 4. In this latter embodiment the flat washer 50 has a cylindrical edge surface 51 and a coaxial conical edge surface 52. The conical surface 52 and the cylindrical surface 51 are silvered to act as reflectors. Here, a ray of light 53 incident normally upon lateral surface 54 is reflected, turned through an angle of 90°, at the reflecting surface 52 and traverses the birefringent material radially and parallel with the lateral surface 54. At the cylindrical surface 51 the ray is reflected back upon itself, travels to conical surface 52, and is there diverted to emerge substantially parallel with its incident direction.

In this device the optical path is twice the radial distance between surfaces 51 and 52. As is known from the stress-optic relationship, the sensitivity increases directly with an increase in the optical path length through a birefringent material. Separation of the incident and transmitted beams of light may be accomplished by means of a polariscope such as that shown in FIGURE 1.

While the embodiments of FIGURES 3 to 5 give excellent qualitative information and important quantitative information, precision depends somewhat upon the ability of the observer to distinguish among various color differences in the observed patterns of birefringence. It is desirable where the maximum precision is required that gauge readings be independent of color and, instead, be of relative positions of indicia and a fixed scale. Such an embodiment is shown in FIGURE 7 as comprising a flat ring 70 having inner and outer cylindrical surfaces, the inner surface 71 being a reflecting surface. The material of this device has been subjected to a permanent birefringence pattern so that in the absence of any applied stress, boundary fringes (known color changes) occur at regularly spaced intervals about the periphery of the device. The formation of such permanent patterns of birefringence may be as disclosed in the copending application of F. Zandman and S. Redner referred to hereinabove. The gauge in this example is shown as a self-contained unit. The functions of external polariscope accessories are provided for by a cylindrical shell of a polarizing material 72 fitted over the outer surface of the ring 70. Light directed radically through the shell 72 is polarized, passes through the birefringent material 70, reflector 71, back through the ring 70, and is analyzed by shell 72 to present a regular pattern of birefringence represented by boundary fringes 73–76. When this gauge is attached to workpiece surface 77 by means of an adhesive bonding layer 78 and the workpiece is stressed, stresses induced in the testpiece 70 will cause a shift of the boundary fringes 73–76. The rotational shift at any angular position is directly proportional to the magnitude of the workpiece stress in the direction radially through that angular position. A scale 79 may be readily provided having units properly determined so that the shift of the boundary fringes is readable directly in stress units, pounds per square inch or the like. Inspection about the perimeter of the testpiece to determine the position where maximum rotation of the boundary fringe has occurred yields directly the position of the maximum principal strain; similarly, the minimum principal strain direction may be easily determined and its magnitude read directly.

A most precise application of the above principles is illustrated in FIGURE 8 wherein the testpiece comprises a longitudinal parallelepiped 80 of a birefringent material again having a preformed permanent pattern of birefringence, as indicated by boundary fringes 81–87. A scale 88 may be provided with indicia related to the non-stressed position of each of the boundary fringes. When this testpiece is bonded to a workpiece 89 and the workpiece is stressed, the shift of each boundary fringe from its normal position will be directly proportional to the stress induced in the testpiece at the position of that boundary fringe. For example, the workpiece may be apertured as at A and A', and stressed in tension by forces F. The stress variation is shown as the curve C plotted from readings of the boundary fringe shifts from their no-load to loaded positions.

The labor involved in plotting the curve C, however, may be eliminated by the further development of this invention illustrated in FIGURES 9 and 10. FIGURE 9 is a side view of a photoelastic testpiece 90 having a pattern of birefringence preformed therein to produce a single boundary fringe 91 parallel with the lateral surface 92. Parallel scale lines 93 may also be provided on a vertical surface as shown so that when this testpiece is bonded to the same workpiece 89 of FIGURE 8, the appearance of the boundary fringe 90 after loading will be as indicated at 90' in FIGURE 10, a representation of the curve C in FIGURE 8 and, of course, an exact representation of stress variations along the gauge length.

It is preferred that each strain gauge of the types illustrated in FIGURES 8–10 be provided with reflecting surfaces normal to the plane of an associated workpiece surface in order to gain the advantage of optical path doubling. Also, it is preferred that such gauges be provided with a polarizer-analyzer of the type described in connection with FIG. 7. However, the polarizer, analyzer, and reflector may be independent of and separated from the testpiece as desired.

In the foregoing disclosure it has been shown that this invention provides an improved method of photoelastic stress gauging and improved photoelastic devices for application as stress gauges. It should be understood, however, that the invention is not limited to the precise arrangements herein described, but that other arrangements within the scope of the appended claims are to be considered within the purview of this invention.

What is claimed is:

1. A stress gauging device for resolving the variable magnitude of a particularly directed stress at a workpiece surface, said device comprising a flat-washer-shaped unitary testpiece stratum of photoelastic material, said stratum having upper and lower plane surfaces, a right cylindrical internally reflecting surface and a conical internally reflecting surface, said stratum being adapted for attachment throughout said lower plane surface only to the workpiece surface so that said lower plane surface is strained substantially equally with the workpiece surface when the latter is thereafter deformed, and polarizing material means contiguous with said upper surface, said surfaces being oriented so that light directed through said polarizing material means to said conical reflecting surface is directed normally of said cylindrical reflecting surface to said cylindrical reflecting surface and from the cylindrical reflecting surface to the conical reflecting surface and out of said testpiece and through said polarizing material means.

2. The device of claim 1 in which said cylindrical surface is the outer peripheral surface and said conical surface is the inner peripheral surface of said washer-shaped stratum.

References Cited in the file of this patent

UNITED STATES PATENTS

| | | |
|---|---|---|
| 1,954,947 | Pajes | Apr. 17, 1934 |
| 1,997,371 | Loiseau | Apr. 9, 1935 |
| 2,206,576 | Pineo | July 2, 1940 |
| 2,415,436 | Maris | Feb. 11, 1947 |
| 2,625,850 | Stanton | Jan. 20, 1953 |

FOREIGN PATENTS

| | | |
|---|---|---|
| Re. 71,278 | France | Apr. 27, 1959 |
| | (Original No. 1,148,457) | |
| 1,148,457 | France | June 24, 1957 |
| 1,161,842 | France | Mar. 31, 1958 |

OTHER REFERENCES

Holland: "The Preparation of the British Model of Standard Strain Discs," Journal of the Society of Glass Technology, June 1945, pages 148–169.